US007653671B2

(12) United States Patent
Ikezawa et al.

(10) Patent No.: US 7,653,671 B2
(45) Date of Patent: Jan. 26, 2010

(54) WIDE AREA DISTRIBUTED STORAGE SYSTEM FOR CHECKING ERASURE OF WORM FILES

(75) Inventors: Mitsuru Ikezawa, Sagamihara (JP); Hidehisa Shitomi, Santa Clara, CA (US); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 260 days.

(21) Appl. No.: 10/866,794

(22) Filed: Jun. 15, 2004

(65) Prior Publication Data

US 2005/0216534 A1 Sep. 29, 2005

(30) Foreign Application Priority Data

Mar. 24, 2004 (JP) .............................. 2004-087671

(51) Int. Cl.
*G06F 12/00* (2006.01)
*G06F 17/30* (2006.01)
(52) U.S. Cl. .................. 707/206; 707/200; 707/203
(58) Field of Classification Search .................. 707/200, 707/206; 711/100, 159, 162
See application file for complete search history.

(56) References Cited

U.S. PATENT DOCUMENTS 6,304,948 B1 * 10/2001 Motoyama et al. .......... 711/162
6,374,262 B1 * 4/2002 Kodama ..................... 707/201
6,978,284 B2 * 12/2005 McBrearty et al. .......... 707/206
7,107,416 B2 * 9/2006 Stuart et al. ................. 711/159
2005/0055518 A1 * 3/2005 Hochberg et al. ........... 711/159
2005/0076066 A1 * 4/2005 Stakutis et al. ............. 707/200
2005/0097260 A1 * 5/2005 McGovern et al. .......... 711/100

FOREIGN PATENT DOCUMENTS

JP 3226158 8/2001

* cited by examiner

*Primary Examiner*—Tony Mahmoudi
*Assistant Examiner*—Paul Kim
(74) *Attorney, Agent, or Firm*—Brundidge & Stanger, P.C.

(57) ABSTRACT

A wide area distributed storage system checks for erasure of WORM (Write-Once Read-Many) files. A first management server acquires a storage location of a second file on a second disk apparatus which corresponds to a first file stored on a first disk apparatus, of which a retention period has expired, and queries a second management server about a retention period of the second file whose storage location has been acquired. The queried second management server refers to a file table and indicates existence or non-existence of the second file on the second disk apparatus and whether the retention period of the second file has expired or not. The system avoids unintended deletion of files by querying a plurality of file management servers about whether a file with an expired retention period should be set as a deletable object.

20 Claims, 7 Drawing Sheets

FIG. 3

FILE TABLE 108a OF FILE MANAGEMENT SERVER 100a (a)

| FILE NAME | STORE LOCATION | | CREATION DATE | RETENTION PERIOD | FILE DELETE ATTRIBUTE FLAG |
|---|---|---|---|---|---|
| | STORAGE APPARATUS NAME | FILE PATH | | | |
| F_3feedc | 200a | /100/200 | YEAR/ MONTH/DAY | 10 YEARS | OFF |
| F_3feedc | 200b | | | | |
| F_256afe | 200a | /106/19 | YEAR/ MONTH/DAY | 10 YEARS | ON |
| F_256afe | 200n | | | | |
| | | | | | |

FILE TABLE 108b OF FILE MANAGEMENT SERVER 100b (b)

| FILE NAME | STORE LOCATION | | CREATION DATE | RETENTION PERIOD | FILE DELETE ATTRIBUTE FLAG |
|---|---|---|---|---|---|
| | STORAGE APPARATUS NAME | FILE PATH | | | |
| F_3feedc | 200b | /103/19 | YEAR/ MONTH/DAY | 10 YEARS | OFF |
| F_3feedc | 200a | | | | |
| | | | | | |
| | | | | | |
| | | | | | |

# WIDE AREA DISTRIBUTED STORAGE SYSTEM FOR CHECKING ERASURE OF WORM FILES

CROSS-REFERENCE TO RELATED APPLICATIONS

The present application claims priority from Japanese application P2004-087671 filed on May 24, 2004, the content of which is hereby incorporated by reference into this application.

BACKGROUND

The present invention relates generally to a file management device for managing WORM (Write-Once Read-Many) files, and more particularly to a file management device that deletes the WORM file in safety.

WORM (Write-Once Read-Many) has hitherto been actualized by way of a write-once type storage medium such as an optical disk. The WORM is a storage medium that is physically incapable of changing such as erasing and overwriting forever after being written once. Over the recent years, however, some disk apparatuses have come into existence, wherein a WORM function is provided on HDD (Hard Disk Drive) that is essentially erasable for the purpose of storing data.

A file management device for managing WORM files, when a retention period of the WORM file expires, automatically (or manually) deletes this WORM file. A system clock of the file management device handles the expiration of the retention period. A relatively high precision is therefore required of this system clock. Further, it is desirable that the management devices, servers, storages, etc. within the same network perform management based on the same fiduciary time as a timestamp (timestamp format) for the files to be managed so that the reference time is the same.

Another system is known (referring to, e.g., JP 3226158 B) in which, between service data management devices spreading across networks, one service data management device manages original data, while the other service data management device stores the data in order to utilize copy data. Then, as in JP 3226158 B, there is known a wide area distributed storage for storing the file in distribution via a wide area network by applying a method of storing copies of the same file in distant locations.

Such being the case, one known time unitary (time synchronization) management system exists, wherein time servers for managing nodes residing in the same network segment on the network on the basis of the same timestamp are provided on networks, and the time managed by the time servers is dealt with by the time unitary management using (implementing) NTP (Network Time Protocol) and so on.

Further, the time is managed by different time servers between different network segments. These different time servers periodically correct the time of the time servers by utilizing the standard time carried on radio waves, GPS (Global Positioning System), etc., thus keeping the time accurate. Therefore, big differences do not occur among even the different time servers.

SUMMARY

If any one of the time servers falls into a large degree of time disorder due to some cause, however, it follows that the whole network segment in which the time servers are provided may fall into the time disorder also.

Other than a machine trouble of the time server itself, a cause for the time disorder of the time server might be an attack such as outside cracking, etc. intended to cause the time disorder of the time server. Especially, in case where the time of the time server is largely changed to future time from the present time, there might be a high possibility that a retention period of a WORM file managed by a file management device under the time-control of the time server will mistakenly expire. In the case of a system structured to automatically delete the files upon expiration of the file retention period, many files might be unintentionally lost.

The present invention has been made in view of the above-mentioned problem, and therefore has an object to provide a storage system configured so as to query a management device in another network segment upon automatic deletion of a file after a retention period of a WORM file has elapsed.

According to the present invention, a first management device acquires from a second storage device a storage location of a file mapped to the file, stored on a first storage device, of which a retention period has expired, and queries a second file management device defined as the acquired file storage location about a retention period of the file whose storage location has been acquired; the second file management device refers to a second file table and gives a response containing a piece of information indicating an existence or non-existence of the file on the second storage device and a piece of information indicating whether the retention period of the file has expired or not; the first file management device notifies a first management server regarding at least one of when the file is not stored on the second storage device and when the retention period of the file in the second file management device has not yet expired, without deleting the file from the first storage device, on the basis of the response; and the first management device deletes the file from the first storage device, when the file is stored on the second file management device and when the retention period of the file has expired also on the second storage device, on the basis of the response.

According to the present invention, system reliability can be enhanced to prevent unintended deletion of the file, even if the system falls into time disorder, by querying a plurality of file management devices about whether the file of which an retention period has expired may be set as a deletable object or not.

BRIEF DESCRIPTION OF THE DRAWINGS

FIGS. 3(*a*) and 3(*b*) show examples of contents of file tables 108 managed by the file management server 100 according to the embodiment of the present invention.

DESCRIPTION OF THE PREFERRED EMBODIMENT

An embodiment of the present invention will hereinafter be described with reference to the drawings.

Figure 1:
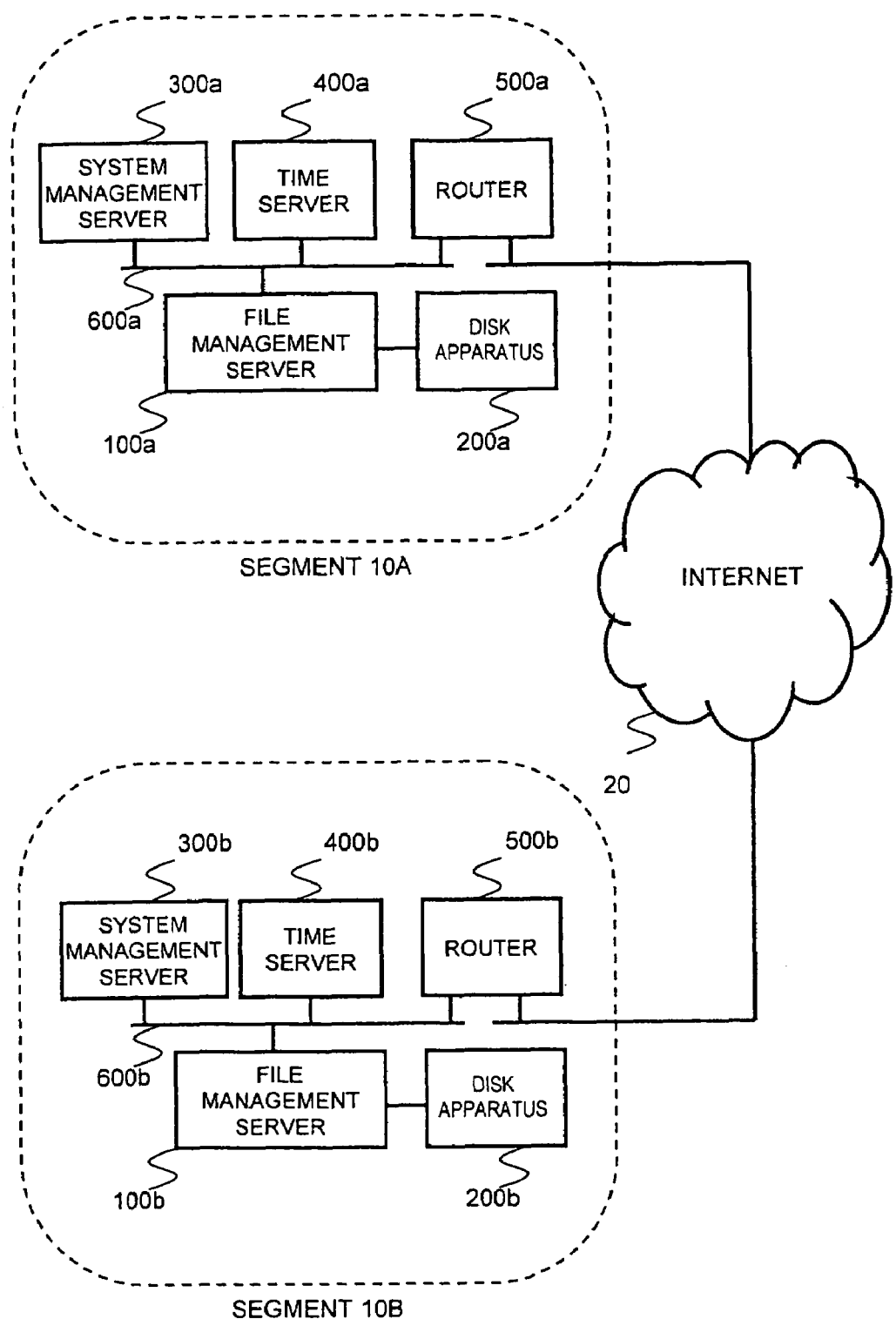
FIG. 1 is a block diagram showing an architecture of a storage system according to an embodiment of the present invention.

FIG. 1 is a block diagram showing an architecture of a storage system according to the embodiment of the present invention.

Two network segments (a network segment 10A and a network segment 10B) are connected to each other via INTERNET 20.

The respective network segments 10 are connected through routers 500 to the INTERNET 20. Networks 600 are built up in the network segments 10. System management server 300, time servers 400, and file management server 100 are connected to the networks 600. Further, disk apparatuses 200 are connected to the file management servers 100.

The system management server 300 is defined as a computer including a CPU, a memory, a storage device, and an interface (not shown). The system management server 300 governs respective nodes residing in the network segment 10 and executes, for example, changing settings by an administrator, notifying the administrator of an error message, and so forth.

The time server 400 is a time management server including a CPU, a memory, a storage device, and an interface (not shown). The time server 400 keeps accurate the internal time of the time server 400 at all times by receiving (synchronizing with) radio waves of the standard time and by utilizing GPS (Global Positioning System). Further, the time server 400 supplies an accurate piece of time information to respective nodes residing in the network segment 10 by use of the protocols such as NTP (Network Time Protocol), etc., thereby enabling the accurate time to be set in the internal clock of each node.

The router 500 effects routing of data between the network segment 10 and the INTERNET 20.

The file management server 100 is defined as a computer device including a CPU, a memory, a storage device, and an interface (not shown in FIG. 1). The file management server 100 to which the disk apparatus 200 is connected manages the files stored on the disk apparatus 200, and controls writing or reading of the files to or from the disk apparatus 200 in response to a request given from a client or the like.

The disk apparatus 200 includes high-speed large-volume storage (archival storage) such as disk drives for storing the data (WORM files), wherein the data are written thereto or read therefrom under the control of the file management server 100.

Copies of the same WORM file are stored (backed up) on the disk apparatus 200a in the network segment 10A and the disk apparatus 200b in the network segment 10B. Namely, one storage device functions as a backup device for the other. Thus, the respective disk apparatuses 200 store the copies of the data in distribution through the INTERNET 20, thereby configuring the wide area distributed storage system.

It should be noted that FIG. 1 shows the two network segments through the INTERNET 20, but the number of the network segments are not limited to two according to the present invention.

Figure 2:
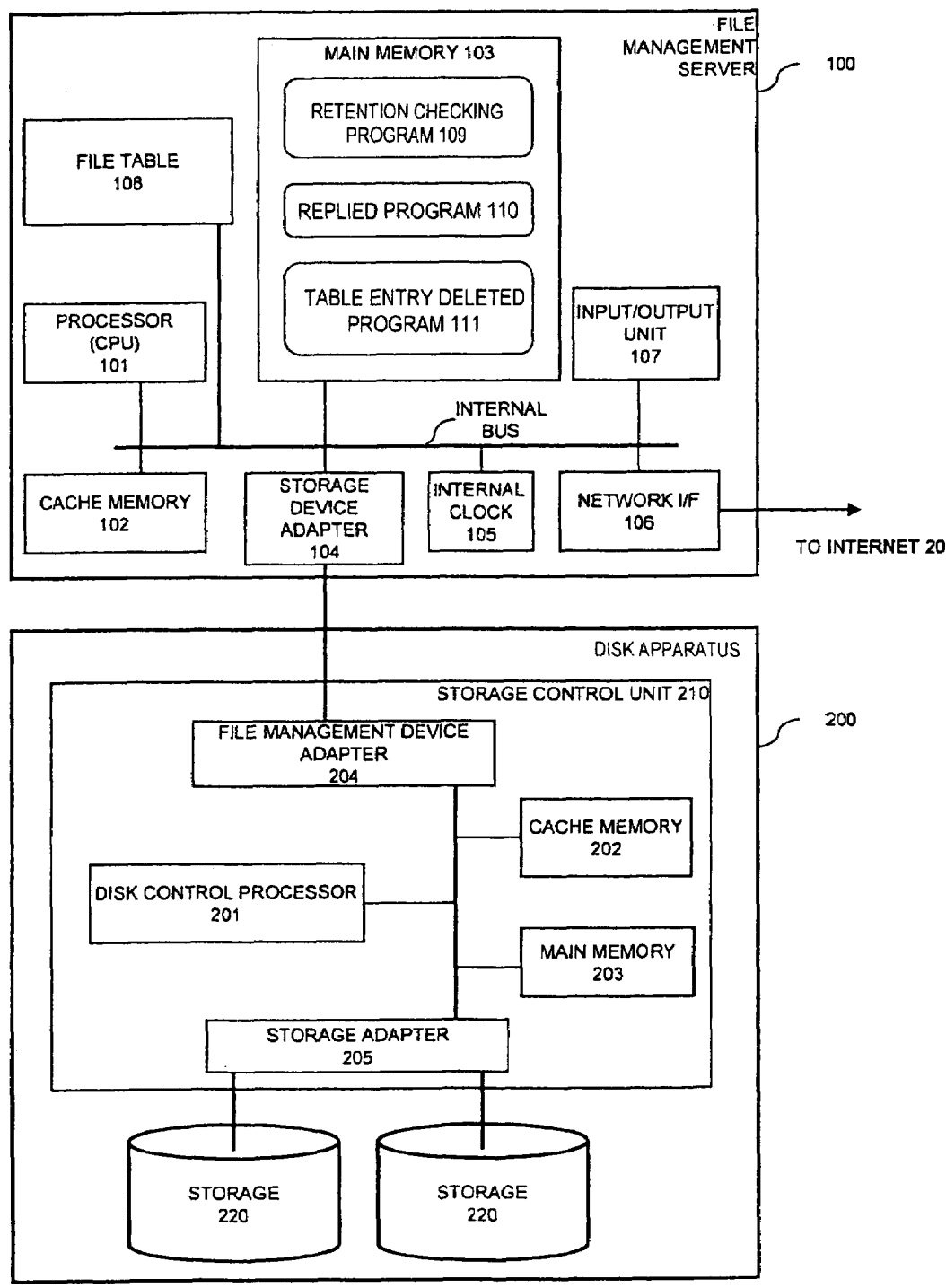
FIG. 2 is a block diagram showing in-depth configurations of a file management server 100 and of a disk apparatus 200 according to the embodiment of the present invention.

FIG. 2 is a block diagram showing in-depth configurations of the file management server 100 and of the disk apparatus 200.

The file management server 100 is constructed of a processor (CPU) 101, a cache memory 102, a main memory 103, a storage device adapter 104, an internal clock 105, a network interface (I/F) 106, an input/output (I/O) unit 107, a file table 108, etc.

The main memory 103 is stored with a retention checking program 109, a replied program 110 and a table entry deleted program 111, and operates under the control of the CPU 101. Incidentally, operations of these programs will be explained later on.

The storage device adapter 104 functions as an interface for transmitting and receiving the data and control signals between the file management server 100 and the disk apparatus 200. The storage device adapter 104 involves using protocols such as a SCSI (Small Computer System Interface) protocol, a Fibre Channel protocol, etc.

The internal clock 105 is a clock that controls the time of the file management server 100. Time information supplied from the internal clock 105 is utilized for indicating a storage date/time (archive date/time) of the file stored (archived) on the disk apparatus 200. The internal clock 105 gives a time query to the time server 400 connecting in the same network segment 10 at an arbitrary time or periodically, and synchronizes the time acquired as a result of the query with its own clock time on the basis of the protocol such as NTP, etc. The time of the internal clock 105 is thus synchronized with the time of the time server 400 at all times.

The network I/F 106, which is connected to the network 20, such as the Internet, transmits and receives datagram such as a packet, etc., by use of, e.g., TCP/IP (Transmission Control Protocol/Internet Protocol). The I/O unit 107 to which an input/output device is connected is used for a user such as an administrator to directly operate the file management server 100. The I/O unit 107 is a serial port, such as an RS-232C port.

The file table 108 is stored with pieces of information of the files stored on the disk apparatus 200, wherein the file information is sorted out in a way that associates these pieces of file information with stored file names. It should be noted that the file name is set unique throughout the network segment 10A and the network segment 10B by the file management server 100 according to a naming standard for the file names. The file management server 100 refers to the file table 108, thereby acquiring the file, judging whether the retention period of the file has expired or not, and so forth.

The disk apparatus 200 is roughly sectioned into a storage control unit 210 and disk drives 220.

The storage control unit 210 is constructed of a disk control processor 201, a cache memory 202, a main memory 203, a file management server adapter 204, a storage adapter 205, etc. The storage control unit 210 controls input and output of the data to the disk drives 220.

The file management server adapter 204 functions as an interface for transmitting and receiving the data between the file management server 100 and the disk apparatus 200. The file management server adapter 204 involves using protocols such as the SCSI (Small Computer System Interface) protocol and the Fibre Channel protocol, etc.

The storage adapter 205 functions as an interface for transmitting and receiving the data to and from the disk drives 220 on the basis of protocols such as the SCSI protocol and the Fibre Channel protocol, etc.

The main memory 203 is preinstalled with, although not shown, a program for controlling the storage control unit 210 and with other programs. These programs run under the control of the disk control processor 201.

The disk drives 220 are constructed of high-speed large-volume storage (archival storage) such as a hard disk.

It should be noted that the disk drives 220 may also be constructed of, without being limited to the hard disk, a tape drive and other disk apparatuses. FIG. 2 shows two pieces of disk drives, however, there may also be adopted a single disk drive and a redundant configuration using two or more pieces of disk drives.

Next, an operation of the embodiment of the present invention having the architecture described above, will be explained.

According to the storage system in the embodiment of the present invention, as discussed above, the WORM file stored in the unspecified network segment 10A is also stored as a copy thereof in other network segment 10B.

It is herein assumed that the retention period of the WORM file stored in the network segment 10A may have already expired. The file management server 100a executes a process for deleting the WORM file of which the retention period has expired. On this occasion, however, the file management server 100a queries other file management server 100b stored with the copy of the WORM file about whether its retention period has expired or not. Then, if it proves from a result of the query that the retention period of the WORM file copy stored on the same file management server 100b also has expired, the file management server 100a deletes the corresponding WORM file stored on the file management server 100a itself. On the other hand, if the retention period of the corresponding WORM file copy stored on other file management server 100b has not yet expired, the file management server 100a judges that an abnormality has occurred in the retention period of the WORM file stored on the file management server 100a itself, and executes a predetermined process such as giving an error notification.

FIGS. 3(a) and 3(b) are explanatory diagrams showing contents of the file table 108 managed by the file management server 100. FIG. 3(a) shows the file table 108a managed by the file management server 100a. FIG. 3(b) shows the file table 108b managed by the file management server 100b.

In the file table 108, every file has one record consisting of pieces of data (values) recorded as entries in at least a "file name" field, a "store location" field (containing a "storage apparatus name" subfield and a "file path" subfield), a "file creation date (file archive date)" field, a "file retention period" field, and a "file delete attribute flag" field. These entries (values) are created when an entity of the file or the copy thereof is stored on the disk apparatus 200. When creating the entries, the file delete attribute flag is set "OFF". In an example shown in FIG. 3(a), a file name "F_3feedc" explicitly shows that a file specified by the file name "F_3feedc" is stored (archived) in a path "/100/200" in the disk apparatus 200a. Further, a value of 10 (ten years) is set as the retention period. This file table 108 also shows that a copy of the file specified by the file name "F_3feedc" is backed up on the disk apparatus 200b. The data entered as the file path, the creation date, the retention period, etc. are managed by the file management server 100b that manages the disk apparatus 200b, and are not therefore recorded as the entries of the file management server 100a. On the other hand, in FIG. 3(b), a file name "F_3feedc" explicitly shows that a file specified by this file name is stored in a path "/103/19" in the disk apparatus 200b.

Further, the file delete attribute flag indicates whether or not the file entity has already been deleted from the disk apparatus. In the example in FIG. 3(a), a storage location of a file specified by a file name "F_256afe" is the disk apparatus 200a. However, the file delete attribute flag is "ON", and hence its implication is that the file entity has already been deleted from the disk apparatus 200a.

It should be noted that the entries of the file, of which the entity was deleted, are to be deleted by use of a table entry deleted program that will be explained later on.

Given next is an explanation of a process executed when the file retention period managed in the file table 108 expires.

Figure 4:
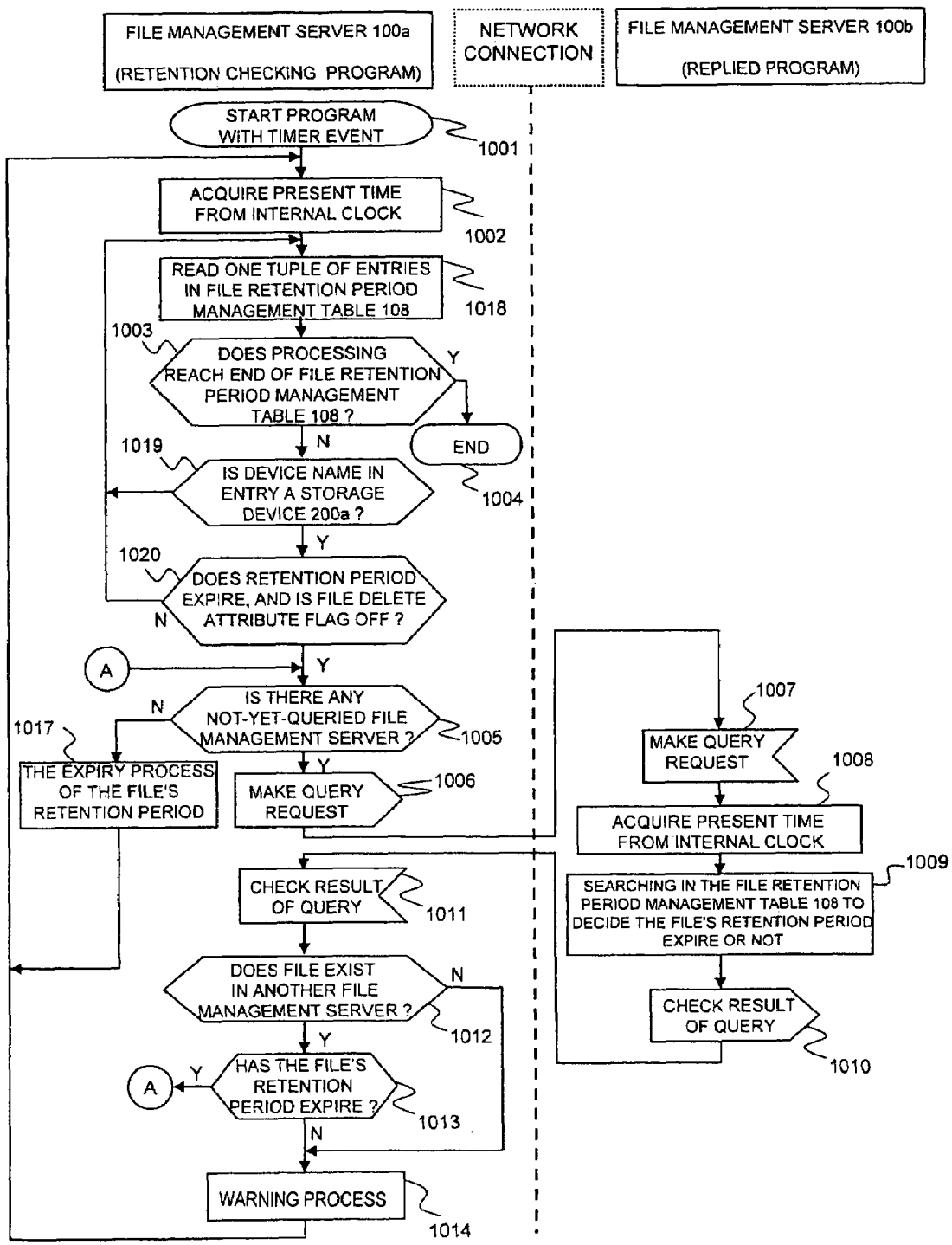
FIG. 4 is a flowchart showing processes of a retention checking program and a replied program on the file management server 100 according to the embodiment of the present invention.

FIG. 4 is a flowchart showing processes of the retention checking program and the replied program on the file management server 100.

As described above, the retention checking program 109 and the replied program 110 run on the file management server 100. It should be noted that the discussion will herein be focused on a process in which the retention checking program of the file management server 100a existing in the network segment 10A queries the replied program of the file management server 100b existing in the network segment 10B.

The retention checking program 109 starts with timer event and starts processing (1001). The retention checking program 109 acquires time information from the internal clock, etc. provided in the file management server 100, and starts at a predetermined interval on the basis of this piece of time information. It should be noted that the retention checking program 109 may also start at an arbitrary timing such as when the administrator gives an instruction, rather than periodically, and so on.

The retention checking program 109 acquires at first the present time from the internal clock 105 (1002). Next, the retention checking program 109 reads one tuple of entries in sequence from the top in the file table 108 under the control of the file management server 100 (1018). Then, the retention checking program 109 checks whether the readout entries are existent entries or not. Namely, if the readout entries are not existent (null entries), this implies that the processing reaches an end of the file table 108 (1003). When judging that the final tuple of entries is reached and that the processing for all tuples of entries is completed, the retention checking program 109 terminates (1004).

On the other hand, if the readout entries are existent, namely, when judging that the processing does not yet reach the end of the file table 108, the retention checking program 109 judges whether or not a device name in the "store location" field in the readout entries is coincident with the disk apparatus 200a managed by the file management server 100a (1019). When judging that the readout entry in the "storage apparatus name" subfield of the "store location" field is not coincident with the disk apparatus 200a managed by the file management server 100a, this tuple of entries is ruled out of a subsequent processing object, and hence the retention checking program returns to the process 1018 (1019).

In the process 1019, the retention checking program, when judging that the readout entry in the "storage location name" subfield of the "store location" field is coincident with the disk apparatus 200a managed by the file management server 100a, refers to an entry as a creation date and an entry as a retention period and compares this retention period with the period acquired in the process 1002. The retention checking program judges from a result of this comparison whether or not the entry given in the "retention period" field exceeds the period acquired in the process 1002, and judges whether the file delete attribute flag is "OFF" or not (1020). When judging that the retention period exceeds the term acquired in the process 1002 and that the file delete attribute flag is "OFF", the retention checking program determines that the retention period of the file specified by these entries is expired, and proceeds to a next process 1005. If other than the case described above, these entries are ruled out of the subsequent processing object, and therefore the retention checking program returns to the process 1018 (1020).

In the process 1005, the file table 108 is again searched in a way that uses the file name as a search key, thereby extracting the file management device (e.g., the file management server 100b in the network segment 10B) in other network segment, which retains a copy of the identified file. Then, it is judged whether the not-yet-queried file management device exists or not among the extracted devices in other network segment that retain the copies of the identified file.

When judging that the queries about all the file management servers 100 have been made, the retention checking program executes the file retention period expiry process for the file concerned (1017). According to this file retention period expiry process, in the file table 108, "ON" is set as an entry in the "file delete attribute flag" field of the file of which the retention period has expired. Then, the file entity stored on the disk apparatus 200a is deleted. It should be noted that a deletable flag may be added as an entry in the file table 108 without deleting the entity of the file whose retention period has expired. In this case, the entity of the file may be deleted simultaneously when deleting the entries of the file, and may also be deleted manually at a different timing by an operation of the administrator. For simplifying the explanation herein, the file entity stored on the disk apparatus 200a is deleted on the occasion of setting "ON" as an entry in the "file delete attribute flag" field of the file whose retention period expiry has been detected. Thereafter, the retention checking program loops back to the process 1002.

In the process 1005, the retention checking program, when judging that there still exists the not-yet-queried file management server 100, sends a query request for querying this file management device (the file management server 100b) whether the file retention period thereof expires or not (1006).

The replied program on the file management server 100b residing in the network segment 10B receives the query request (1007). The replied program obtains the present time from the internal clock 105 (1008). Next, the replied program judges whether a file name contained in the query request specifies a file whose copy is retained on the file management server 100b itself, by referring to the file table 108b in a way that uses the file name contained in the query request as a search key. Then, in the case of a file of which the copy is retained on the file management server 100b itself, the replied program refers to the file table 108b, thereby judging whether the file retention period has expired or not (1009).

Subsequently, the replied program gives the query request sender, i.e., the file management server 100a as a result of the process 1009, viz., a response to the query about whether or not the query requested file is the file whose copy is retained on the file management server 100b itself and whose retention period is expired (1010).

The retention checking program on the file management server 100a receives the result of the query sent from the file management server 100b (1011). Then, the retention checking program judges from the received query result whether or not the copy of the file concerned has been stored on other file management devices (the file management server 100b) that has sent the result of the query request (1012). The retention checking program, when judging that the file copy has been stored on the file management server 100 concerned, judges from the received result of the query whether the file retention period has expired or not (1013). The retention checking program, when judging that the retention period of the query requested file expires on the file management server 100b, returns to the process 1005, wherein the retention checking program continues the process with respect to other file management servers 100.

In the process 1012, on the other hand, if the file copy is judged not to be stored on other file management server 100, or if it is judged that the retention period of the file copy stored on other file management server 100 does not yet expire, the retention checking program judges that some abnormality has occurred in the storage system and executes a warning process of giving an alarm to the system management server 300a (1014). In this warning process, the retention checking program sends the alarm to the system management server 300a, and outputs a content of the abnormality (the file copy is not existent, the retention period of the file copy does not expire, and so forth) to an output device such as a display provided in the system management server 300a. The administrator examines the alarm content outputted and performs a necessary measure for the storage system. It should be noted that the alarming process may be, without being limited to the output to the output device, for example, attained by notifying the administrator through an alarm light, an alarm bell, etc., recording on MIB (Management Information Base), and so on.

Figure 5:
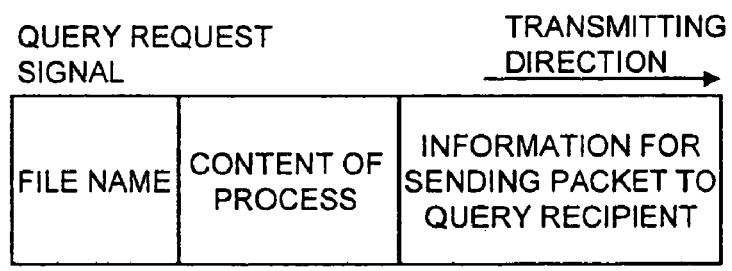
FIG. 5 is an explanatory diagram showing contents of a query request packet according to the embodiment of the present invention.

FIG. 5 is an explanatory diagram showing contents of a query request packet sent to the query recipient, i.e., the file management server 100b from the retention checking program in the process 1006 described above.

The query request packet contains at least a necessary piece of information (required for being transferred across the network) for transmitting the query request packet itself to the query recipient, a content of the process (that indicates a query about the file retention period) and a content showing a file name of the query target file.

Figure 6:
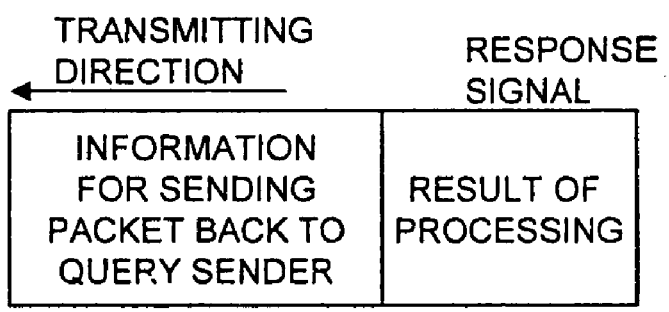
FIG. 6 is an explanatory diagram showing contents of a query response packet according to the embodiment of the present invention.

FIG. 6 is an explanatory diagram showing contents of a query response packet sent back to the query sender, i.e., the file management server 100a from the replied program in the process 1010 described above.

The query response packet contains at least a necessary piece of information (needed for being transferred across the network) for transmitting the query response packet itself to the query sender and contents of the process (that indicate whether the retention period of the request file expires or not, whether the file is existent or not, and so forth).

Given next is a description of how the entries of the already-deleted file are deleted from the file table 108.

As explained above, the file of which the retention period has expired is, after the retention checking program has confirmed the expiry of the file retention period, automatically (or manually) deleted from the disk apparatus 200. At this time, the entries of the file still remain in the file table 108. After the file entity has been deleted, the entries thereof in the file table 108 are unnecessary and therefore deleted by the table entry deleted program 111.

Figure 7:
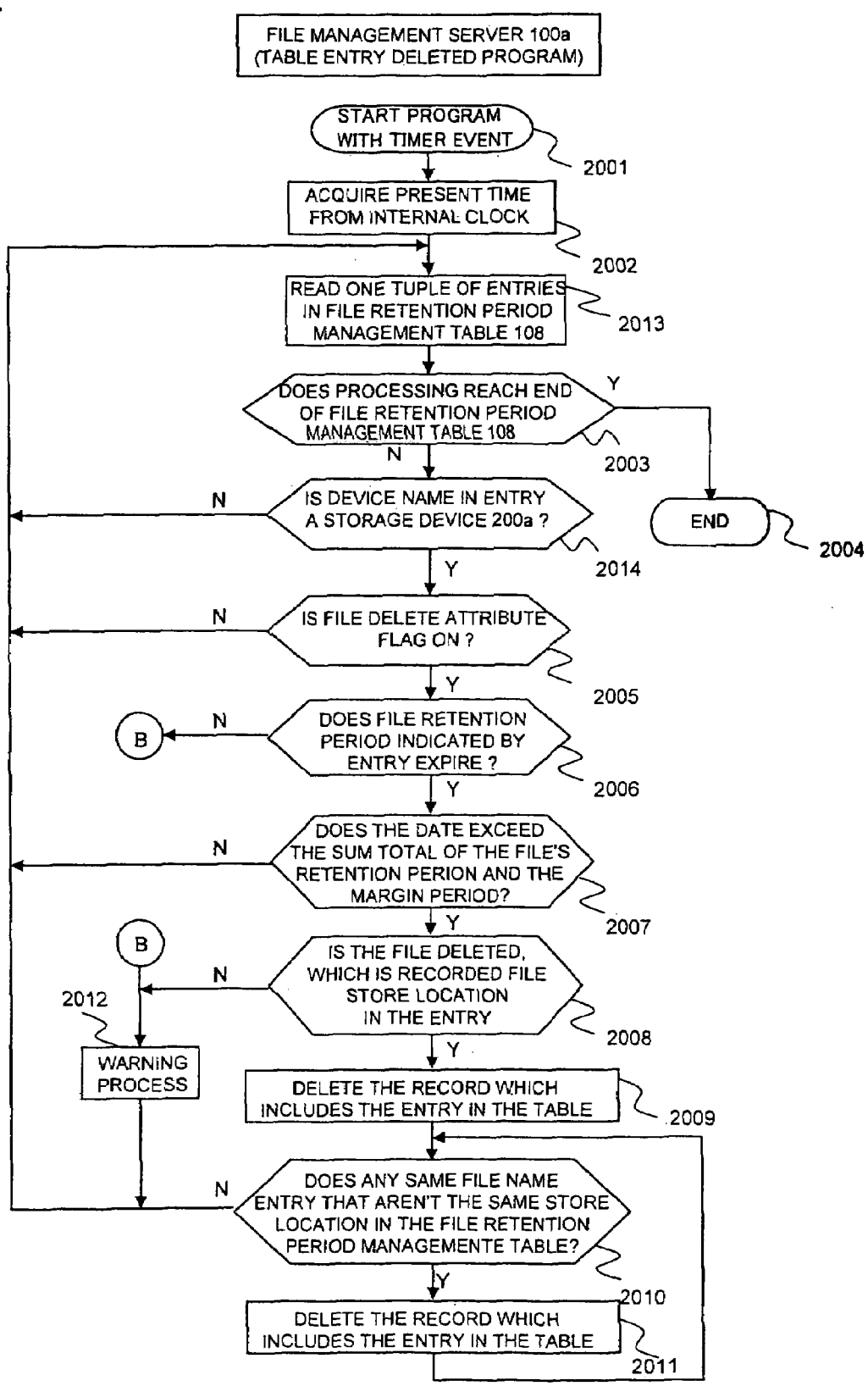
FIG. 7 is a flowchart showing processes of a table entry deleted program according to the embodiment of the present invention.

FIG. 7 is a flowchart showing processes of the table entry deleted program. Given herein is an explanation of the processes in which the table entry deleted program on the file management server 100a residing in the network segment 10A deletes the entries in the file table 108.

The table entry deleted program starts with timer event and starts processing (2001). The table entry deleted program acquires time information from the internal clock, etc. provided in the file management server 100, and starts at a predetermined interval on the basis of this piece of time information. It should be noted that the table entry deleted program may also start not periodically but at an arbitrary timing as the administrator gives an instruction, and so on.

The table entry deleted program acquires at first the present time from the internal clock 105 (2002).

Next, the table entry deleted program reads one tuple of entries in sequence from the top in the file table 108 under the control of the file management server 100 (2013). Then, the table entry deleted program checks whether the readout entries are existent entries or not. Namely, if the readout entries are not existent (null entries), this implies that the processing reaches an end of the file table 108 (2003). When judging that the final tuple of entries is reached and that the processing for all tuples of entries is completed, the table entry deleted program terminates (2004).

On the other hand, if the readout entries are existent, namely, when judging that the processing does not yet reach the end of the file table 108, the table entry deleted program next judges whether or not an entry in the "storage apparatus name" subfield of the "store location" field is coincident with the disk apparatus 200a managed by the file management server 100a (2014). When judging that the readout entry in the "storage name" subfield of the "store location" field is not coincident with the disk apparatus 200a managed by the file management server 100a, this tuple of entries is ruled out of a subsequent processing object, and hence the table entry deleted program returns to the process 2013 (2014).

Next, the table entry deleted program judges whether the entry as the file delete attribute flag is effective or not, i.e., whether the file delete attribute flag is "ON" or not (2005). The table entry deleted program, when judging that the file delete attribute flag is not effective, i.e., the file delete attribute flag is "OFF", has no necessity of deleting the entries concerned and therefore returns to the process 2013 in order to execute the process for other tuple of entries.

The table entry deleted program, when judging that the entry as the file delete attribute flag is effective, judges whether the file retention period of the file specified by the concerned entries expires or not, by comparing with the present time acquired in the process 2002 (2006). When judging that the file retention period does not yet expire, the file retention period does not yet expire, and nevertheless an attribute of deletion is given to the entries of the file concerned, so that the table entry deleted program judges that some abnormality occurs in the file management server 100 or the storage system. Then, the table entry deleted program executes a process of giving an alarm to the system management server 300 (2012). In this alarming process, the table entry deleted program sends the alarm to the system management server 300, and outputs a content of the abnormality (the file delete attribute is ON in the file table 108 before the file retention period expires, namely, the file entity is to be deleted, and so on) to the output device such as the display provided in the system management server 300. The administrator examines the alarm content outputted and performs a necessary measure for the storage system.

The table entry deleted program, when judging that the file retention period expires, next judges which the sum total of the file retention period, that indicated by the entry value, and the margin period has exceeded or not. (2007).

Herein, the margin period is a term during which the entries themselves are left in the effective status of the file delete attribute flag even after deleting the file entity from the disk apparatus 200. This margin period is the term provided in consideration of a possibility that after the retention checking program on the file management server 100 has deleted the entity of the file with its retention period expired from the disk apparatus 200, other file management 100 might refer to the entries of the deleted file.

For instance, a case will be explained, wherein the retention checking program executed on the file management server 100a is set to start in the morning, while the retention checking program executed on the file management server 100b is set to start in the afternoon. In this case, on the very same day, an entity of a file whose retention period expires might be deleted on the file management server 100a but might not yet be deleted on the file management server 100b. Here, the program on the file management server 100b sends the query request to the file management server 100a. However, if the file entity is deleted on the file management server 100a, and if the entries in the file table are deleted immediately thereafter, a query response saying that the file concerned does not exist is sent back, resulting in an error. For preventing this error, even after automatically deleting the file entity, the entries themselves are left in the effective status of the file delete attribute flag till the margin period expires. It should be noted that it is desirable that the margin period be set to be several times as long as a start interval of the retention checking program. The margin period is set to, for example, ten days if the program starts once a day as in the present embodiment.

The table entry deleted program 111, when judging that the period of the indicated-by-entry-value the sum total of the file retention period and margin period does not yet expire, does not execute the delete process for the entry concerned and returns to the process 2013 to execute the processes for another tuple of entries.

The table entry deleted program 111, when judging that the period of the indicated-by-entry-value the sum total of the file retention period and margin period expires, next judges the file deleted or not, which is recorded file store location (the disk apparatus 200) in the entry (2008). Incidentally, an assumption herein is that the file entity stored on the disk apparatus 200a has already been deleted in the file retention period expiry process (the process 1017 in FIG. 6).

The table entry deleted program 111, if the file entity is not deleted, judges that some abnormality occurs in the file management server 100 or the storage system. Then, the table entry deleted program 111 executes a warning process of giving an alarm to the system management server 300 (2012). In this warning process, the table entry deleted program 111 sends the alarm to the system management server 300, and outputs a content of the abnormality (the file retention period expires, but the file entity remains without being erased, and so on) to the output device such as the display provided in the system management server 300. The administrator examines the alarm content outputted and performs a necessary operation to the storage system.

The table entry deleted program 111, when judging that the file entity has been deleted, deletes the record which included the entry in the table (2009). Next, the table entry deleted program 111 refers to the file table 108 by use of the file name as a search key, thereby judging whether or not there is same file name entries (showing a different device name, i.e., the different disk apparatus 200 connected to the file management server 100) that aren't the same "store location" (2010).

The table entry deleted program 111, when judging that there is no same file name entries that aren't the same "store location", returns to the process 2013, wherein the table entry deleted program 111 executes the processes for other tuple of entries. The table entry deleted program 111, when judging that the same file name entries that aren't the same "store location" exists, deletes the entries associated with this file (2011). Then, the table entry deleted program 111 returns to the process 2010 and repeats the processes 2010 and 2011 till all the entries of this file stored in the different storage location are deleted from the file table 108.

As discussed above, the table entry deleted program 111 deletes the entries of the file whose entity has been deleted from the file table 108 after the predetermined period has elapsed.

According to the storage system in the embodiment of the present invention having the architecture described above, the file management server 100, when judging that there expires the retention period of the file (the WORM file) stored on the storage device under the control of the file management server 100, queries other file management servers 100 retaining a copy of the file so as to check whether the retention period has expired or not. If it proves from a check result that the retention period of the file copy likewise is expired, this file can be deleted.

The scheme described above makes it possible to detect an abnormality in time on the file management server 100 or an abnormality in the entries registered. If the time mechanism on the file management server 100 managing the file retention period is considerably disordered (such as by hacking of the time server 400 controlling the time on the file management server 100, and so forth), if the file table 108 of the file management server 100 is rewritten (falsified) by hacking, etc., and if the internal clock 105 of the file management server 100 is set ahead of the real time by hacking, etc., it is possible to enhance the security of the system by preventing the file from being unintentionally erased.

Further, the WORM file is the file that should be stored for the fixed period of time, and hence the retention period can be more surely managed according to the present invention.

While the present invention has been described in detail and pictorially in the accompanying drawings, the present invention is not limited to such detail but covers various obvious modifications and equivalent arrangements, which fall within the purview of the appended claims.

What is claimed is:

1. A file management method in a storage system having a first network segment and a second network segment that are connected to each other,
   wherein the first network segment includes:
   a first disk apparatus storing a first file,
   a first management server having a first file table managing a storage location and a retention period of the first file stored on the first disk apparatus, and
   a first time server providing first time information to the first management server,
   wherein the second network segment includes:
   a second disk apparatus storing a second file corresponding to the first file and having the same content as that of the first file stored on the first disk apparatus,
   a second management server storing a second file table managing a storage location and a retention period of the second file stored on the second disk apparatus, and
   a second time server, independent of the first time server, providing second time information to the second management server,
   said file management method comprising:
   obtaining, by the first management server, the storage location of the second file which corresponds to the first file when the first time information indicates that the retention period of the first file has expired based on the first time information,
   sending a query from the first management server to the second management server defined as the obtained storage location of the second file to determine whether the retention period of the second file has expired;
   referring, by the second management server, to the second file table and the second time information, and sending a response to the first management server indicating whether the retention period of the second file has expired based on the second time information;
   receiving the response by the first system management server;
   generating, by the first management server, a notification that deletion of the first file from the first disk apparatus is not permitted when the response indicates that the retention period of the second file has not yet expired;
   flagging the first file for deletion from the first disk apparatus, by the first management server, when the response indicates that the retention period of the second file has expired also on the second disk apparatus;
   obtaining, by the second management server, the storage location of the first file which corresponds to the second file when the second time information indicates that the retention period of the second file has expired based on the second time information,
   sending a query from the second management server to the first management server defined as the obtained storage location of the first file to determine whether the retention period of the first file has expired;
   referring, by the first management server, to the first file table and the first time information, and sending a response to the second management server indicating whether the retention period of the first file has expired based on the first time information;
   receiving the response by the second management server;
   generating, by the second management server, a notification that deletion of the second file from the second disk apparatus is not permitted when the response indicates that the retention period of the first file has not yet expired; and
   flagging the second file for deletion from the second disk apparatus, by the second management server, when the response indicates that the retention period of the first file has expired also on the first disk apparatus.

2. A plurality of management servers connected to disk apparatuses, each management server comprising:
   an internal clock; and
   a file table managing a storage location and a retention period of files stored on the disk apparatuses, the management server managing the files stored on the disk apparatuses based on a result of comparing a present time acquired from the internal clock with the retention period of the file recorded in the file table,
   wherein a first management server of said management servers connected to a first disk apparatus of said disk apparatuses:
   searches for a second disk apparatus of said disk apparatuses storing a second file which corresponds to a first file, stored on the first disk apparatus, when a first said internal clock indicates that the retention period of the first file has expired,
   queries a second management server of said management servers managing the second disk apparatus located by the search for a retention period of the second file,
   receives notice from the second management server as to whether the retention period of the second file has expired in the second management server according to a second said internal clock in the second management server that is independent of the first internal clock,
   generates a notification that the first file is not permitted to be deleted from the first disk apparatus, when a result of the query determines that the retention period of the second file has not yet expired in the second management server, and flags the first file for deletion from the first disk apparatus when the result of the query indicates that the retention period of the second file has expired in the second management server; and wherein the second management server:

searches for the first disk apparatus storing the first file which corresponds to the second file, stored on the second disk apparatus, when the second internal clock indicates that the retention period of the second file has expired, queries the first management server managing the first disk apparatus located by the search about a retention period of the first file, receives notice from the first management server as to whether the retention period of the first file has expired in the first management server according to the first internal clock in the first management server that is independent of the second internal clock, generates a notification that the second file is not permitted to be deleted from the second disk apparatus, when a result of the query determines that the retention period of the first file has not yet expired in the first management server, and flags the second file for deletion from the second disk apparatus when the result of the query indicates that the retention period of the first file has expired in the first management server.

3. The plurality of management servers according to claim 2, wherein the first management server:

receives notice from the second management server when information corresponding to the second file is not stored on the second management server; and wherein the second management server:

receives notice from the first management server when information corresponding to the first file is not stored on the first management server.

4. The plurality of management servers according to claim 2, wherein the time of the first internal clock is managed by a first time server connected via a first network to the first management server, wherein a time of the second internal clock of the second management server as a query recipient is managed by a second time server through a second network, and wherein the first time server and the second time server are different from each other.

5. The plurality of management servers according to claim 4, wherein the first management server is connected together with the first time server to the first network, wherein the second management server is connected together with the second time server to the second network, and wherein the first network and the second network belong to different network segments.

6. The plurality of management servers according to claim 2, wherein the first management server, upon receiving a received query about the retention period of the first file from the second management server, refers to the file table provided in the first management server and the first internal clock, and sends to the second management server a response containing information indicating an existence or non-existence of the first file related to the received query and indicating whether the retention period of the first file related to the received query has expired or not, and wherein the second management server, upon receiving a received query about the retention period of the second file from the first management server, refers to the file table provided in the second management server and the second internal clock, and sends to the first management server a response containing information indicating an existence or non-existence of the second file related to the received query and indicating whether the retention period of the second file related to the received query has expired or not.

7. The plurality of management servers according to claim 2, wherein the first management server deletes information corresponding to the first file in the file table after a predetermined period has elapsed since the retention period of the first file expired after the first file has been deleted from the first disk apparatus, as the result of the query; and wherein the second management server deletes information corresponding to the second file in the file table after a predetermined period has elapsed since the retention period of the second file expired after the second file has been deleted from the second disk apparatus, as the result of the query.

8. The plurality of management servers according to claim 2, wherein after executing a process of deleting the first file from the first disk apparatus based on the result of the query, the first management server:

notifies the second management server of when the retention period of the first file recorded in the file table has expired, without deleting information corresponding to the first file in the file table, and deletes the information corresponding to the first file in the file table after a predetermined period has elapsed since the retention period of the first file expired, when the retention period of the first file in the file table has expired and when the first file is not stored on the first disk apparatus; and wherein after executing a process of deleting the second file from the second disk apparatus based on the result of the query, the second management server:

notifies the first management server of when the retention period of the second file recorded in the file table has expired, without deleting information corresponding to the second file in the file table, and deletes the information corresponding to the second file in the file table after a predetermined period has elapsed since the retention period of the second file expired, when the retention period of the second file in the file table has expired and when the second file is not stored on the second disk apparatus.

9. A storage medium having stored thereon a computer program which is executable by a management server that is connected to a disk apparatus, said management server including an internal clock and a file table managing a storage location and a retention period of files stored on the disk apparatus, said computer program when executed causing:

a first management server, which is connected to a first disk apparatus, to perform:

a first step of acquiring a present time from a first internal clock included in the first management server, a second step of searching for a second disk apparatus storing a second file which corresponds to a first file, stored on the first disk apparatus, when the retention period of the first file has expired, a third step of querying a second management server managing the second disk apparatus located by the search of a retention period of the second file, a fourth step of receiving notice of whether the retention period of the second file has expired in the second management server according to a second internal clock included in the second management server that is independent of the first internal clock, a fifth step of generating a notification as a result of the query that deletion of the first file from the first disk apparatus is not permitted when the notice indicates that the retention period of the second file has not yet expired in the second management server, and a sixth step of flagging the first file for deletion from the first disk apparatus when the notice indicates that the retention period of the second file has expired in the second management server, thereby managing the first file stored on the first disk apparatus; and the second management server to perform:

a seventh step of acquiring a present time from the second internal clock, an eighth step of searching for the first disk apparatus storing the first file which corresponds to the second file, stored on the second disk apparatus, when the retention period of the second file has expired, a ninth step of querying the second management server managing the first disk apparatus located by the search about a retention period of the first file, a tenth step of receiving notice of whether the retention period of the first file has expired in the first management server according to the first internal clock of the first management server that is independent of the second internal clock, an eleventh step of generating a notification as a result of the query that deletion of the second file from the second disk apparatus is not permitted when the notice indicates that the retention period of the first file has not yet expired in the first management server, and a twelfth step of flagging the second file for deletion from the second disk apparatus when the notice indicates that the retention period of the first file has expired in the first management server, thereby managing the second file stored on the second disk apparatus.

10. The storage medium according to claim 9, wherein said computer program when executed causing:

the first management server to perform:

the fourth step to include receiving a reply when the second file is not stored on the second management server, and the second management server to perform:

the tenth step to include receiving a reply when the first file is not stored on the first management server.

11. The storage medium according to claim 9, wherein said computer program when executed causing:

the first management server to perform:

a first additional step of referring, upon receiving a received query about the retention period of the first file from the second management server, to the file table provided in the first management server and the first internal clock, and sending to the second management server a response containing information indicating an existence or non-existence of the first file related to the received query and indicating whether the retention period of the first file related to the received query has expired or not; and the second management server to perform:

a second additional step of referring, upon receiving a received query about the retention period of the second file from the first management server, to the file table provided in the second management server and the second internal clock, and sending to the second management server a response containing information indicating an existence or non-existence of the second file related to the received query and indicating whether the retention period of the second file related to the received query has expired or not.

12. The storage medium according to claim 9, wherein said computer program when executed causing:

the first management server to perform:

a first additional step of deleting information corresponding to the first file in the file table, after a predetermined period has elapsed since the retention period of the first file expired after the first file has been deleted from the first disk apparatus as a result of the query, and the second management server to perform:

a second additional step of deleting information corresponding to the second file in the file table, after a predetermined period has elapsed since the retention period of the second file expired after the second file has been deleted from the second disk apparatus as a result of the query.

13. The storage medium according to claim 9, wherein said computer program when executed causing:

the second management server to perform:

a first additional step of notifying of, after executing a process of deleting the first file from the first disk apparatus based on a result of the query, when the retention period of the first file recorded in the file table has expired, without deleting information corresponding to the first file in the file table, and deleting the information corresponding to the first file in the file table after a predetermined period has elapsed since the retention period of the file expired, when the retention period of the first file in the file table has expired and when the first file is not stored on the first disk apparatus, and the second management server to perform:

a second additional step of notifying of, after executing a process of deleting the second file from the second disk apparatus based on a result of the query, when the retention period of the second file recorded in the file table has expired, without deleting information corresponding to the second file in the file table, and deleting the information corresponding to the second file in the file table after a predetermined period has elapsed since the retention period of the file expired, when the retention period of the second file in the file table has expired and when the second file is not stored on the second disk apparatus.

14. A file management method according to claim 1, further comprising the steps of receiving, by the first management server, notice from the second management server when information corresponding to the second file is not stored on the second management server; and receiving, by the second management server, notice from the first management server when information corresponding to the first file is not stored on the first management server.

15. A file management method according to claim 1, further comprising the step of:

respectively deleting the first file or the second file flagged for deletion from the corresponding first disk apparatus or second disk apparatus at a predetermined time after said corresponding step of flagging of the first file or the second file.

16. The plurality of management servers according to claim 2, wherein the first management server deletes the first file flagged for deletion from the first disk apparatus after a predetermined period of time and the second management server deletes the second file flagged for deletion from the second disk apparatus after a predetermined period of time.

17. The storage medium according to claim 9, wherein said computer program when executed further causing:

the first or second management server to delete the corresponding first or second file flagged for deletion from the first or second disk apparatus at a predetermined time after the corresponding sixth or twelfth step of flagging the first file for deletion.

18. A file management method according to claim 1, further comprising the steps of:

managing first and second entries for said first and second files in first and second file tables, respectively;

judging whether a sum total of the retention period of the first file and a margin period has expired, and deleting the first entry in the first file table when the sum total of the retention period for the first file and the margin period has expired; and judging whether a sum total of the retention period of the second file and a margin period has expired, and deleting the second entry in the second file table when the sum total of the retention period for the second file and the margin period has expired.

19. The plurality of management servers according to claim 2, wherein the first management server and the second management server manage first and second entries in the first and second file tables for the first and second files, respectively, and wherein the first management server judges whether a sum total of the retention period of the first file and a margin period has expired, and deletes the first entry in the first file table when the sum total of the retention period for the first file and the margin period has expired; and wherein the second management server judges whether a sum total of the retention period of the second file and a margin period has expired, and deletes the second entry in the second file table when the sum total of the retention period for the second file and the margin period has expired.

20. The storage medium according to claim 9, wherein said computer program when executed causing:

the first management server to perform:

a first additional step of judging whether a sum total of the retention period of the first file and a margin period has expired, and deleting a first entry in the first file table for the first file when the sum total of the retention period for the first file and the margin period has expired, and the second management server to perform:

a second additional step of judging whether a sum total of the retention period of the second file and a margin period has expired, and deleting a second entry in the second file table for the second file when the sum total of the retention period for the second file and the margin period has expired.

* * * * *